United States Patent
Lin et al.

(10) Patent No.: US 9,967,586 B2
(45) Date of Patent: May 8, 2018

(54) METHOD AND APPARATUS OF SPATIAL MOTION VECTOR PREDICTION DERIVATION FOR DIRECT AND SKIP MODES IN THREE-DIMENSIONAL VIDEO CODING

(71) Applicant: MediaTek Inc., Hsin-Chu (TW)

(72) Inventors: Jian-Liang Lin, Su'ao Township Yilan County (TW); Yi-Wen Chen, Taichung (TW)

(73) Assignee: MEDIATEK INC., Hsin-Chu (TW)

( * ) Notice: Subject to any disclaimer, the term of this patent is extended or adjusted under 35 U.S.C. 154(b) by 274 days.

(21) Appl. No.: 14/655,951

(22) PCT Filed: Dec. 20, 2013

(86) PCT No.: PCT/CN2013/090117
§ 371 (c)(1),
(2) Date: Jun. 26, 2015

(87) PCT Pub. No.: WO2014/106435
PCT Pub. Date: Jul. 10, 2014

(65) Prior Publication Data
US 2015/0358636 A1   Dec. 10, 2015

Related U.S. Application Data

(60) Provisional application No. 61/749,458, filed on Jan. 7, 2013.

(51) Int. Cl.
*H04N 19/00* (2014.01)
*H04N 19/513* (2014.01)
(Continued)

(52) U.S. Cl.
CPC ........... *H04N 19/513* (2014.11); *H04N 19/00* (2013.01); *H04N 19/176* (2014.11);
(Continued)

(58) Field of Classification Search
CPC .... H04N 13/00; H04N 13/0048; H04N 19/52; H04N 19/597
See application file for complete search history.

(56) References Cited

U.S. PATENT DOCUMENTS 5,590,538 A * 1/1997 Hsu ..................... F25B 9/02
62/51.1
6,686,270 B1 * 2/2004 Subramanian .... H01L 21/76807
257/E21.525
(Continued)

FOREIGN PATENT DOCUMENTS

CN    102131094    7/2011
CN    102668562    9/2012
(Continued)

OTHER PUBLICATIONS

Tech, G., et al.; "3D-HEVC Test Model 2;" Joint Collaborative Team on 3D Video Coding Extension Development of ITU-T SG 16 WP3 and ISO/IEC JTC 1/SC 29/WG 11; Oct. 2012; pp. 1-118.
(Continued)

*Primary Examiner* — Frank Huang
(74) *Attorney, Agent, or Firm* — McClure, Qualey & Rodack, LLP

(57) ABSTRACT

A method and apparatus for spatial motion vector prediction (MVP) candidate derivation for Direct mode and Skip mode in three-dimensional video coding are disclosed. The motion vector of each neighboring block is associated with a corresponding reference picture index pointing to a corresponding reference picture. For both the Direct mode and the Skip mode, the motion vector of each neighboring block is selected as the spatial MVP candidate for each neighboring block only if the corresponding reference picture index is the same as a selected target reference picture index. In one embodiment, the target reference picture index is set to 0. In another embodiment, the target reference picture index
(Continued)

corresponds to a majority of the corresponding reference picture indexes associated with the neighboring blocks in Direct mode or Skip mode.

15 Claims, 7 Drawing Sheets

(51) Int. Cl.
| | |
|---|---|
| *H04N 19/176* | (2014.01) |
| *H04N 19/597* | (2014.01) |
| *H04N 19/593* | (2014.01) |
| *H04N 19/573* | (2014.01) |
| *H04N 19/58* | (2014.01) |
| *H04N 19/105* | (2014.01) |
| *H04N 19/11* | (2014.01) |
| *H04N 19/103* | (2014.01) |

(52) U.S. Cl.
CPC ......... *H04N 19/573* (2014.11); *H04N 19/58* (2014.11); *H04N 19/593* (2014.11); *H04N 19/597* (2014.11); *H04N 19/103* (2014.11); *H04N 19/105* (2014.11); *H04N 19/11* (2014.11)

(56) References Cited

U.S. PATENT DOCUMENTS

| | | | | |
|---|---|---|---|---|
| 7,477,401 B2* | 1/2009 | Marx | ............... | G01B 11/0608 356/609 |
| 7,485,892 B2* | 2/2009 | Ooi | ............... | B82Y 20/00 257/14 |
| 9,036,692 B2 | 5/2015 | Tsai et al. | | |
| 2009/0290643 A1* | 11/2009 | Yang | ............... | H04N 19/597 375/240.16 |
| 2010/0157308 A1* | 6/2010 | Xie | ............... | A61B 5/0066 356/477 |
| 2010/0266042 A1* | 10/2010 | Koo | ............... | H04N 19/597 375/240.16 |
| 2010/0288949 A1* | 11/2010 | Yoo | ............... | B01L 3/502715 251/65 |
| 2012/0134416 A1 | 3/2012 | Lin et al. | | |
| 2012/0128060 A1 | 5/2012 | Lin et al. | | |
| 2012/0257207 A1* | 10/2012 | Marx | ............... | G01B 9/02004 356/451 |
| 2013/0022122 A1 | 1/2013 | Oh | | |
| 2013/0101040 A1 | 4/2013 | Francois et al. | | |
| 2013/0229485 A1* | 9/2013 | Rusanovskyy | .... | H04N 13/0048 348/43 |
| 2015/0312545 A1* | 10/2015 | Xu | ............... | H04N 19/597 348/43 |

FOREIGN PATENT DOCUMENTS

| | | |
|---|---|---|
| CN | 102752595 A | 10/2012 |
| KR | 1020120005934 | 1/2012 |
| WO | 2007/081756 A2 | 7/2007 |
| WO | 2012005549 A2 | 1/2012 |
| WO | WO 2012/023763 | 2/2012 |
| WO | 2012171442 A1 | 12/2012 |

OTHER PUBLICATIONS

Nam, J., et al.; "Advanced Motion and disparity prediction for 3D video coding;"International Organisation for Standardisation; Nov. 2011; pp. 1-5.

An, J., et al.; "3D-CE5.h related—Inter-view motion prediction for HEVC-based 3D video coding;" Joint Collaborative Team on 3D Video Coding Extension Development of ITU-T SG 16 WP3 and ISO/IEC JTC 1/SC 29/WG 11; Jul. 2012; pp. 1-6.

Zhang, L., et al; "AHG5-MV-HEVC software for HTM;" Joint Collaborative Team on 3D Video Coding Extension Development of ITU-T SG 16 WP3 and ISO/IEC JTC 1/SC 29/WG 11; Oct. 2012; pp. 1-5.

Zhang, L., et al.; "3D-CE5.h related—Improved temporal motion vector prediction for merge;" Joint Collaborative Team on 3D Video Coding Extension Development of ITU-T SG 16 WP3 and ISO/IEC JTC 1/SC 29/WG 11; Oct. 2012; pp. 1-4.

Hannukkela, M.M., et al.; "3D-AVC draft text 4;" Joint Collaborative Team on 3D Video Coding Extension Development of ITU-T SG 16 WP3 and ISO/IEC JTC 1/SC 29/WG 11; Oct. 2012; pp. 1-70.

Jung, J., et al.; "AHG 10 Report on Inter Component Dependencies;" Joint Collaborative Team on Video Coding (JCT-VC) of ITU-T SG16 WP3 and ISO/IEC JTC1/SC29/WG11; Oct. 2012; pp. 1-5.

Lin, J.L., et al.; "3D-CE5. A related—Direct MVP derivation with reduced complexity;" Joint Collaborative Team on 3D Video Coding Extension Development of ITU-T SG 16 WP3 and ISO/IEC JTC 1/SC 29/WG 11; Jan. 2013; pp. 1-3.

International Search Report dated Feb. 27, 2014, issued in application No. PCT/CN2013/090117.

* cited by examiner

METHOD AND APPARATUS OF SPATIAL MOTION VECTOR PREDICTION DERIVATION FOR DIRECT AND SKIP MODES IN THREE-DIMENSIONAL VIDEO CODING

CROSS REFERENCE TO RELATED APPLICATIONS

The present invention is a National Phase Application of PCT Application Serial No. PCT/CN2013/090117, filed on Dec. 20, 2013, which claims priority to U.S. Provisional Patent Application, Ser. No. 61/749,458, filed on Jan. 7, 2013, entitled "Methods of Simplified Disparity Vector Derivation and Inter-view Motion Vector Prediction in 3D or Multi-view Video Coding". The priority applications are hereby incorporated by reference in their entirety.

FIELD OF INVENTION

The present invention relates to video coding. In particular, the present invention relates to spatial motion vector prediction candidate derivation for both Direct mode and Skip mode in three-dimensional video coding.

BACKGROUND OF THE INVENTION

Three-dimensional (3D) television has been a technology trend in recent years that is targeted to bring viewers sensational viewing experience. Multi-view video is a technique to capture and render 3D video. The multi-view video is typically created by capturing a scene using multiple cameras simultaneously, where the multiple cameras are properly located so that each camera captures the scene from one viewpoint. The multi-view video with a large number of video sequences associated with the views represents a massive amount data. Accordingly, the multi-view video will require a large storage space to store and/or a high bandwidth to transmit. Therefore, multi-view video coding techniques have been developed in the field to reduce the required storage space and the transmission bandwidth. A straightforward approach may simply apply conventional video coding techniques to each single-view video sequence independently and disregard any correlation among different views. Such straightforward techniques would result in poor coding performance. In order to improve multi-view video coding efficiency, multi-view video coding always exploits inter-view redundancy. The disparity between two views is caused by the locations and angles of the two respective cameras. The disparity model, such as an affine model, is used to indicate the displacement of an object in two view frames. Furthermore, motion vector for frames in one view can be derived from the motion vector for respective frames in another view.

For 3D video, besides the conventional texture data associated with multiple views, depth data is often captured or derived as well. The depth data may be captured for video associated with one view or multiple views. The depth information may also be derived from images of different views. The depth data may be represented in lower spatial resolution than the texture data. The depth information is useful for view synthesis and inter-view prediction.

Some standard development activities for 3D video coding have been undertaken by Joint Collaborative Team on 3D Video Coding Extension Development within the international standardization organization—ITU-T. In the software test model version 5.0 of Advanced Video Coding (AVC)-based 3D video coding (3DV-ATM-6.0), a motion vector prediction (MVP) candidate for Skip/Direct mode is derived based on disparity vectors (DVs) of neighboring blocks according to a predefined derivation order. When a block is coded in Direct mode, the motion information can be inferred from previously coded information without explicit signaling of the motion information. When a block is coded in Skip mode, neither the motion information nor the residual information is signaled. In this case, the residual signals are inferred as zero.

FIG. 1 illustrates an example of priority-based MVP for Skip/Direct mode according to 3DV-ATM-6.0. A disparity vector (114) associated with the central point (112) of current block 110 (in a dependent view) is used to find a corresponding point (122) of a corresponding block (120) in the reference view (a base view). The MV (126) of the block (124) that covers the corresponding point (122) in the reference view is used as the inter-view MVP candidate of the current block. Disparity vector 114 can be derived from both the neighboring blocks and the depth value of central point 112. The depth information associated with the current texture block (110) is shown in FIG. 1 as block 130 and the central point is shown as a shaded box. If any of the neighboring blocks has a DV, (e.g. $DV_A$ for block A in FIG. 1), the DV of the neighboring block is used as the disparity vector to locate the corresponding block in the reference picture. Otherwise, the converted disparity, namely the depth-based disparity is used, where the disparity is converted from the depth value of the central point and camera parameters. Compared to the approach that only uses the depth-based disparity, the approach that uses DVs from spatial neighboring blocks can reduce error propagation in case that the depth value of the central point is not available. The terms "disparity" and "disparity vector" are used interchangeably.

When the corresponding block pointed to by the DV of the neighboring block has no motion information available, the inter-view candidate will be regarded as not available and it continues to search spatial candidate from the neighboring block. Alternatively, the inter-view candidate derivation process can be based on the disparity converted from the depth of the current block. When a corresponding block pointed by the DV of the neighboring block or the DV converted from the depth of current block is Intra-coded or uses an invalid reference picture for the current picture, the motion information of the corresponding block is considered as unavailable. The exemplary flowchart of inter-view candidate derivation based on the median of three spatial candidates derived from the neighboring blocks A, B, and C (D is used only when C is unavailable) is shown in FIG. 2. On the decoder side, motion compensation is performed using the motion information of the derived MVP candidate. The motion information includes the prediction direction (uni-direction prediction or bi-direction prediction), the reference picture type (temporal prediction, virtual prediction, or inter-view prediction), and the reference picture index.

FIG. 2 illustrates an exemplary flowchart of inter-view MVP derivation according to 3DV-ATM-6.0. The input data to the priority based MVP candidate derivation process comprises motion data (210) associated with neighboring blocks A, B and C of the texture picture in a dependent view and depth data of the current block (250) in the dependent view. Any disparity information associated with a neighboring block is considered motion information for inter-view prediction. The availability of DVs associated with neighboring blocks is checked in step 220. If the MV for a neighboring block is not available, the MV is replaced by a derive disparity vector (DV) as shown in step 230, where the derive disparity vector is converted from the depth data associated with the current block. The disparity data for replacing an unavailable MV may correspond to the maximum disparity of the current block (step 260). The final disparity may be determined based on the median of the MVP candidates (i.e., the DVs associated with blocks A, B and C) as shown in step 240. After the disparity vector is derived for the current block, a block (124) covering the corresponding point (122) in the reference picture can be identified. The motion vector (126) associated with block 124 can be used as the inter-view MVP candidate.

In 3DV-ATM-6.0, list 0 MV and list 1 MV of the inter-view candidate are inferred independently when using the DVs of neighboring blocks to locate the corresponding point in the reference view. Specifically, the MVP for list 0 is derived by first locating a corresponding block in the reference picture based on the list 0 DV of neighboring blocks (if available) and then using the MV of the corresponding block as the MVP candidate for list 0. Similarly, the MVP for list 1 is derived by first locating a corresponding block in the reference picture based on the list 0 DV of neighboring blocks (if available) and then using the MV of the corresponding block as the MVP candidate for list 1. As shown in FIG. 3, for a current block (310) in a dependent view, list 0 DV and list 1 DV of neighboring blocks of the current block may be different and thus may locate different corresponding blocks ($C_{01}$ and $C_{02}$) in the reference view. An exemplary flowchart associated with list 0 and list 1 interview candidate derivation is shown in FIG. 4. The flowchart is for list 0 if ListX corresponds to list 0 and the flowchart is for list 1 if ListX corresponds to list 1. The steps (410-460) in FIG. 4 are similar to those of FIG. 2 (210-260). However, the process is performed for list 0 and list 1 inter-view MVP derivation separately, where ListX corresponds to either list 0 or list 1. For example, in step 420, only the motion data (e.g., DV) associated with a neighboring block pointing to a reference picture in list 0 is considered available if the target reference picture is in list 0. The central position (472) of current block (470) can use the derived disparity vector to locate a corresponding position 482 in a corresponding block 480. The motion vector associated with a block (484) covering the corresponding point (482) in the based view is used as the interview MVP candidate for the respective list.

When the inter-view MVP candidate is not available, the median of three spatial MVP candidates derived from the neighboring blocks A, B, and C is used as the MVP for Skip or Direct mode according to 3DV-ATM-6.0. The derivation procedures of Inter MVP candidate in Skip/Direct mode and inter-view MVP candidate are shown in FIG. 5A and FIG. 5B respectively.

If the target reference picture index points to a temporal reference picture, the corresponding MVP derivation procedure is shown in FIG. 5A. The reference picture index may be abbreviated as the reference index in this disclosure. The input data for the procedure comprises motion data (510) associated with neighboring blocks A, B and C of the current block of the texture picture in a dependent view and depth data of the current block (560) in the dependent view. For each neighboring block, the procedure first checks whether the neighboring block has any MV pointing to the target reference index (520A). If a neighboring block does not have an MV pointing to the target reference index, the MV for the neighboring block is replaced by a derived MV as shown in step 530A. The derived MV is obtained from a corresponding block located in the reference view according to the maximum disparity of the current block as shown in step 570A. The temporal MV (550A) is derived based on the median of the MVs associated with the neighboring blocks (540A). If none of the neighboring blocks has any MV pointing to the target reference picture and the corresponding block of the current block in the reference view does not have any MV pointing to the target reference index, a zero MV is used to represent the MV of the neighboring blocks.

If the target reference index points to an inter-view reference picture, the corresponding MVP derivation procedure is shown in FIG. 5B. For each neighboring block, the procedure first checks whether the neighboring block has a DV pointing to the target reference index as shown in step 520B. If the neighboring block doesn't have a DV pointing to the target reference index, a DV converted from the depth values in the associated depth block (step 570B) is used to replace the unavailable DV of the neighboring block (step 530B). The disparity vector (550B) is derived from the median of the MVP candidates (540B).

The spatial MVP derivations for Direct mode and Skip mode according to 3DV-ATM-6.0 are shown in FIG. 6. The target reference index is selected to be zero for Skip mode. For Direct mode, the target reference index is selected according to the minimum reference index of the neighboring blocks as shown in step 610. After the target reference index is identified, the availability of MV for blocks A, B and C pointing to the selected target reference index are performed in steps 620A and 620B respectively for Direct mode and Skip mode. The spatial MVP is then determined based on the median of the MVs of the neighboring blocks as shown in step 630.

The reference picture for Direct Mode may change from block to block (e.g., a coding unit or a macroblock). For video encoding, when a block is coded in Direct mode, the motion estimation process may have to access the reference pictures repeatedly during rate-distortion optimization associated with an MVP. The switch between different reference pictures from block to block will cause high latency to derive spatial MVP, reduce cache efficiency, and increase memory bandwidth requirement. Furthermore, it may have to load reference blocks from different reference pictures on a block to block basis. FIG. 7 illustrates an example where the MVP derivation for blocks 710 has to switch between two reference frames (idx 0 and idx 1) corresponding to reference picture index 0 and reference picture index 1. It is desirable to simplify the spatial MVP derivation process in order to reduce cache efficiency and reduce memory bandwidth requirement.

SUMMARY OF THE INVENTION

A method and apparatus for spatial motion vector prediction (MVP) candidate derivation for Direct mode and Skip mode in three-dimensional video coding are disclosed. Neighboring blocks of a current block and a target reference picture index are identified. The motion vector of each neighboring block is associated with a corresponding reference picture index pointing to a corresponding reference picture. For both Direct mode and Skip mode, the motion vector of the neighboring block is selected as the spatial MVP candidate for the neighboring block only if the corresponding reference picture index is the same as the target reference picture index. A default vector is selected as a spatial MVP candidate for said each neighboring block if the corresponding reference picture index of the neighboring block is not the same as the target reference picture index. The default vector can be derived from motion information of a corresponding block in a reference view corresponding to the current block, a disparity vector converted from depth samples of a depth block associated with current block, or a zero motion vector. A final spatial MVP is determined based on the spatial MVP candidates selected for the neighboring blocks. Video encoding or decoding is then applied to the input data using the final MVP. In one embodiment, the target reference picture index is set to 0. In another embodiment, the target reference picture index corresponds to the majority of the corresponding reference picture indexes associated with the neighboring blocks in Direct mode or Skip mode. The final spatial MVP can be derived based on the median, minimum, maximum, mean, majority or linear combination of the spatial MVP candidates selected for the neighboring blocks. As another example, the final spatial MVP can be derived based on the first available MVP candidate from the spatial MVP candidates according to a pre-defined search order. The neighboring blocks may comprise a left block, an upper block, an upper-right block of the current block and an upper-left block of the current block which is used only when the upper-right block of the current block is not available.

In another embodiment, if the target reference picture index points to a temporal reference picture, the spatial MVP candidate derivation process checks whether a first corresponding reference picture index associated with the motion vector of each neighboring block is the same as the target reference picture index and whether any of one or more second corresponding reference picture indexes associated with the motion vectors of one or more corresponding blocks in a reference view is the same as the target reference picture index. If none of the first corresponding reference picture index and said one or more second corresponding reference picture indexes is the same as the target reference picture index, a zero motion vector is used as the spatial MVP candidate for the neighboring block. The one or more corresponding blocks in a reference view may correspond to one corresponding block in the reference view corresponding to the current block. The one or more corresponding blocks in a reference view may correspond to one corresponding block in the reference view corresponding to the neighboring block of the current block. The one or more corresponding blocks in a reference view may also correspond to two corresponding blocks in the reference view corresponding to the current block and the neighboring block of the current block.

DETAILED DESCRIPTION

Figure 1:
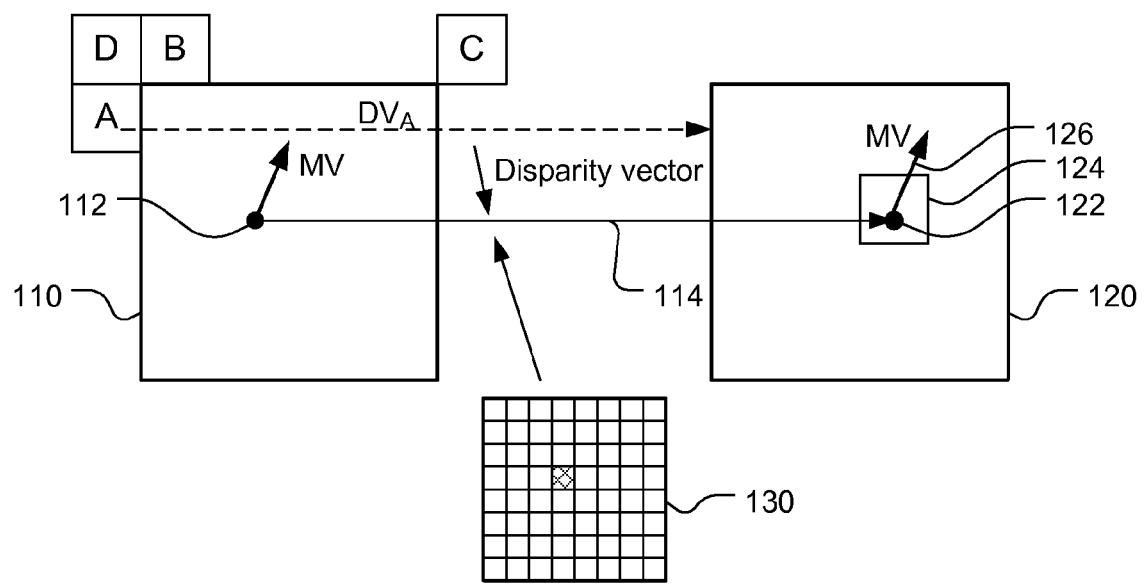
FIG. 1 illustrates an example of priority-based motion vector prediction (MVP) for Skip/Direct mode according to conventional three-dimensional video coding based on the Advanced Video Coding (AVC) standard.
Figure 2:
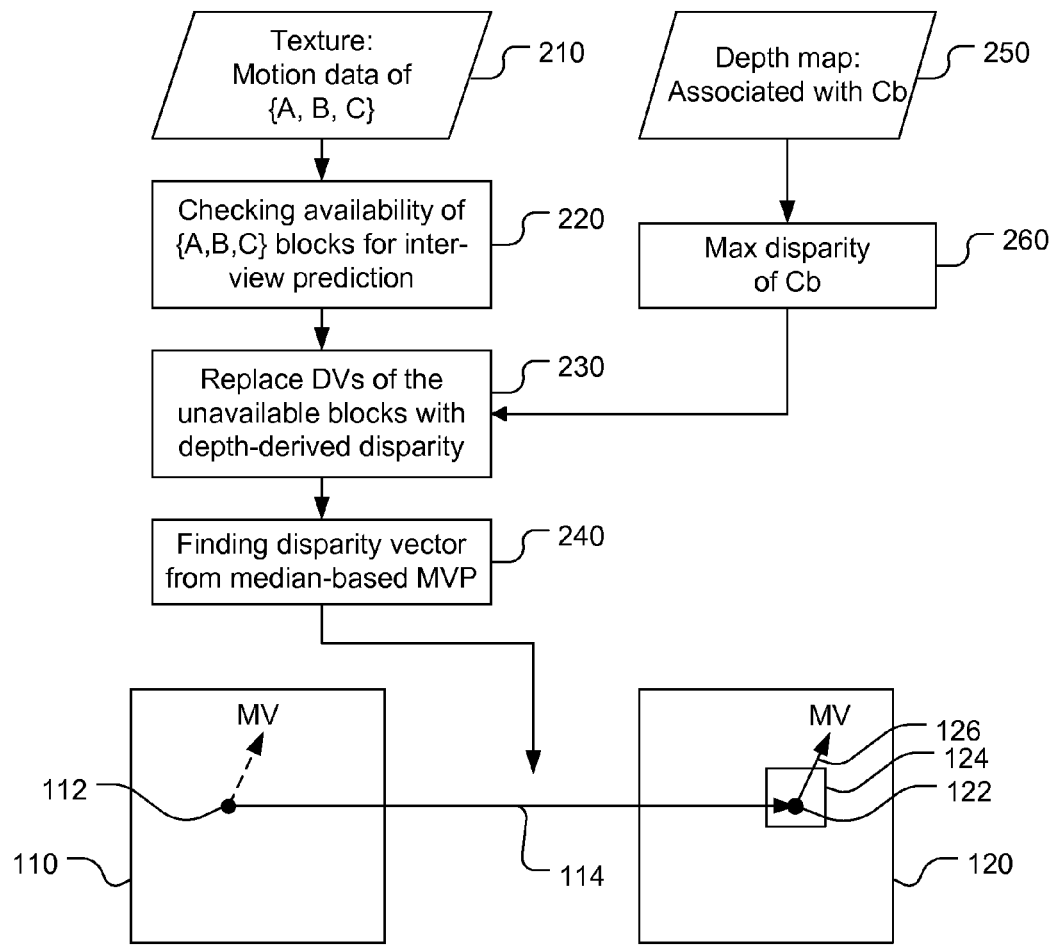
FIG. 2 illustrates an exemplary flowchart of inter-view MVP derivation according to conventional three-dimensional video coding based on the Advanced Video Coding (AVC) standard.
Figure 3:
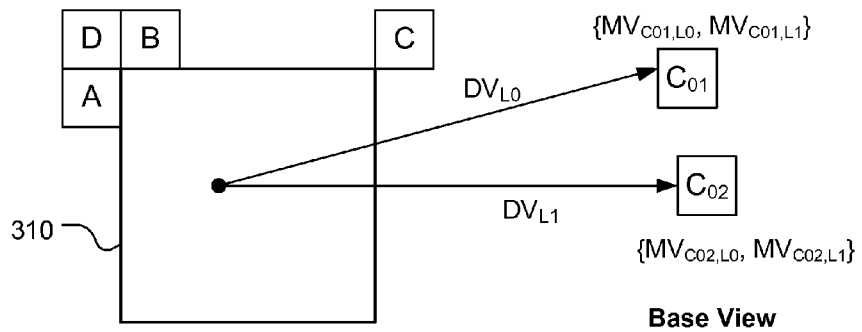
FIG. 3 shows different list 0 DV and list 1 DV of neighboring blocks that locates different corresponding blocks ($C_{01}$ and $C_{02}$) in the reference view according to conventional three-dimensional video coding based on the Advanced Video Coding (AVC) standard.
Figure 4:
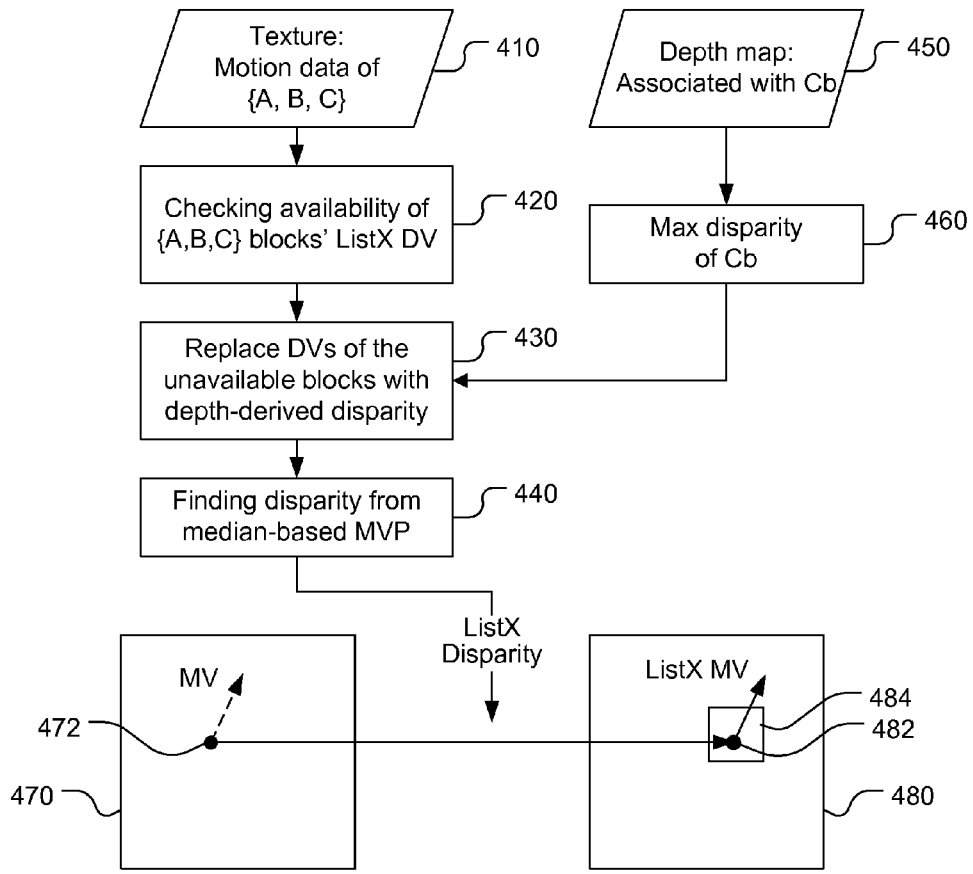
FIG. 4 illustrates an exemplary flowchart associated with list 0 and list 1 interview candidate derivation based on different list 0 DV and list 1 DV of neighboring blocks, where the flowchart is for list 0 if ListX corresponds to list 0 and the flowchart is for list 1 if ListX corresponds to list 1.
Figure 5A:
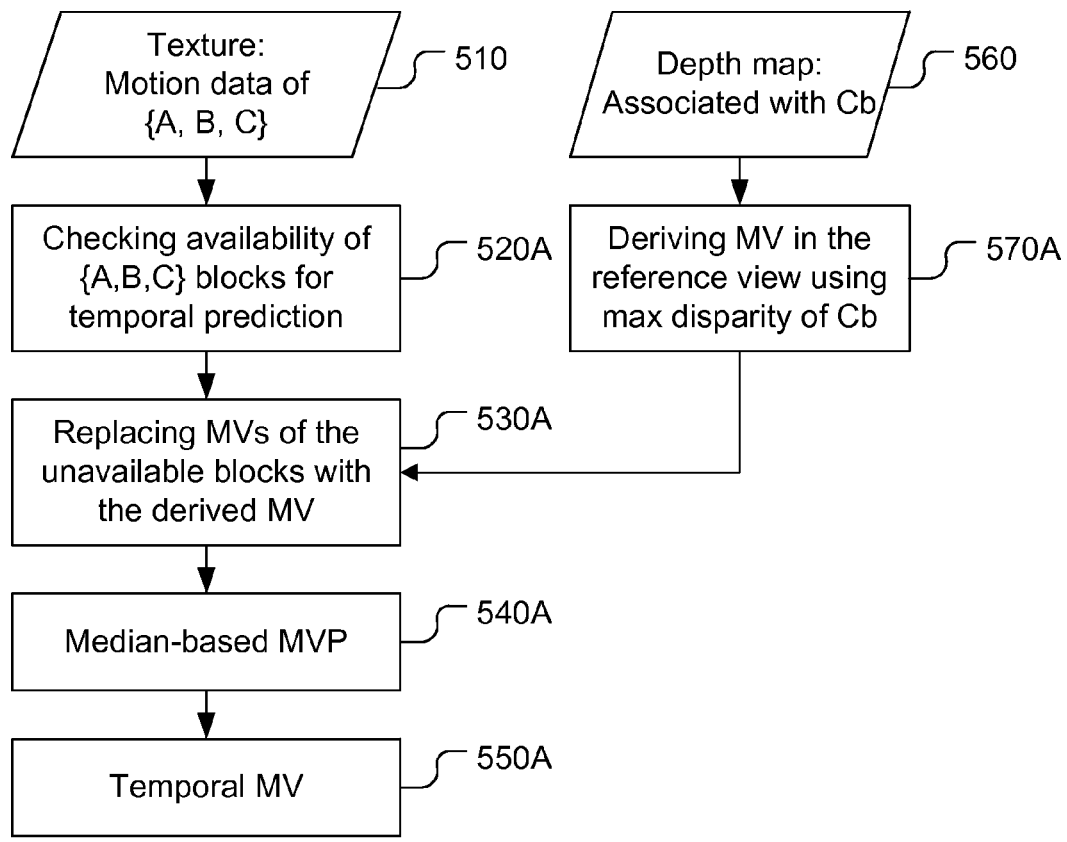
FIG. 5A illustrates an exemplary derivation procedure for Inter MVP candidate in Skip/Direct mode according to conventional three-dimensional video coding based on the Advanced Video Coding (AVC) standard.
Figure 5B:
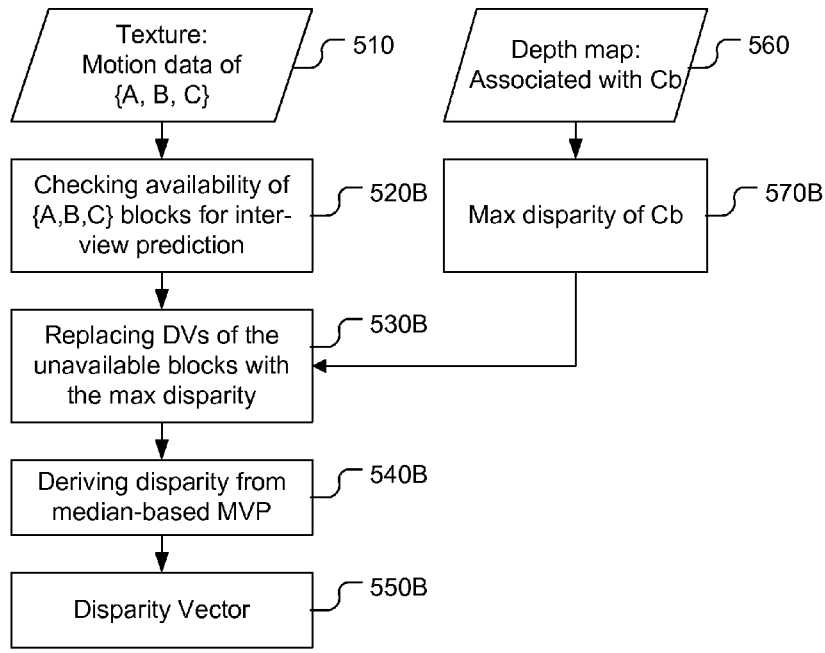
FIG. 5B illustrates an exemplary derivation procedure for inter-view MVP candidate according to conventional three-dimensional video coding based on the Advanced Video Coding (AVC) standard.
Figure 6:
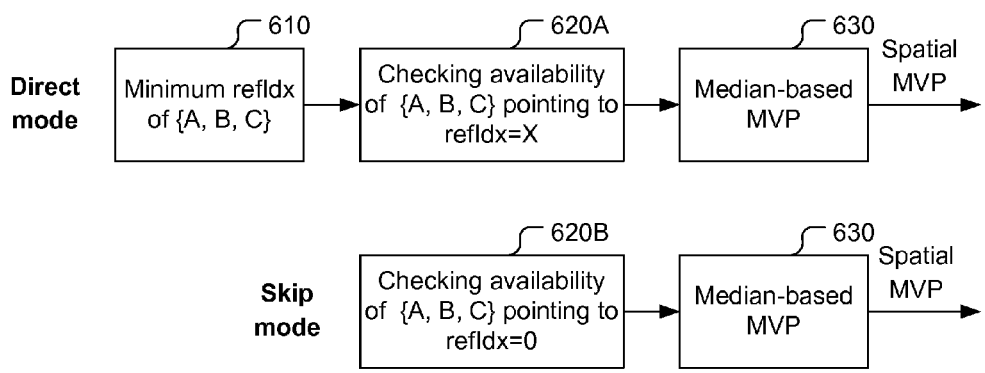
FIG. 6 illustrates an exemplary process for spatial motion vector prediction candidate derivation in Direct mode and Skip mode based on the conventional ATM (AVC based Test Model for 3D Video Coding).
Figure 7:
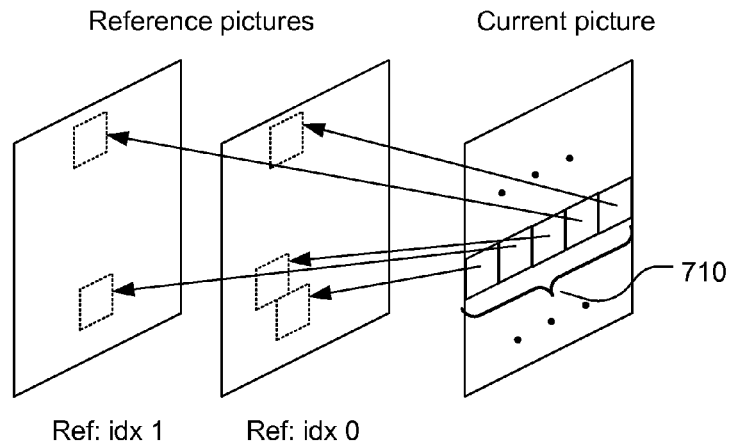
FIG. 7 illustrates an example of reference pictures required for spatial motion vector prediction derivation in Direct and Skip modes based on the conventional ATM (AVC based Test Model for 3D Video Coding).

As mentioned earlier that the spatial MVP candidate derivation procedures for Direct mode and Skip mode according to 3DV-ATM-6.0 are different. The target reference index is always set to zero for Skip mode. However, for Direct mode, the target reference index is selected according to the minimum reference index associated with the motion vectors of the neighboring blocks. Therefore, the spatial MVP candidates for Direct mode and Skip mode may point to different reference pictures, which may reduce cache efficiency and increase memory bandwidth requirement. The spatial MVP derivation is performed on a block basis (e.g., macroblock (MB) based or largest coding unit (LCU) based). Therefore, the reference picture may have to be switched from block to block, which makes the situation even worse.

In order to overcome the issue described above, an embodiment of the present invention restricts the target reference index to zero for Direct mode. Therefore, the target reference indexes for both Skip and Direct modes are zero. In another embodiment according to the present invention, the target reference indexes for Direct and Skip modes are unified. For example, the target reference index can be set to zero for both Direct and Skip modes. In yet another embodiment according to the present invention, the target reference index for Direct and/or Skip mode is set to the majority of the target reference indexes of the spatial neighboring blocks in Direct and/or Skip mode. In yet another embodiment according to the present invention, if the target reference index points to a temporal reference picture, the derivation procedure of the spatial MVP candidates first checks, for each neighboring block, whether the neighboring block has any MV pointing to the target reference index, or whether the corresponding block of current block or the corresponding block of the neighboring block in the reference view has any MV pointing to the target reference index. If none of the neighboring block and the corresponding blocks associated with the current block and the neighboring block has an MV pointing to the target reference index, a zero MV is used as the MVP candidate for the neighboring block. In yet another embodiment according to the present invention, if the target reference index points to a temporal reference picture, the derivation procedure of the spatial MVP candidates first checks for each neighboring block whether the neighboring block has any MV pointing to the target reference index or whether the corresponding block of the neighboring block in the reference view has any MV pointing to the target reference index. If neither the neighboring block nor the corresponding block of the neighboring block in the reference view has an MV pointing to the target reference index, a zero MV is used as the MVP candidate for the neighboring block. In yet another embodiment according to the present invention, if the target reference index points to a temporal reference picture, the derivation procedure of the spatial MVP candidates first checks for each neighboring block whether the neighboring block has any MV pointing to the target reference index or whether the corresponding block associated with the current block has any MV pointing to the target reference index. If neither the neighboring block nor the corresponding block of the current block in the reference view has an MV pointing to the target reference index, a zero MV is used as the MVP candidate for the neighboring block.

Figure 8:
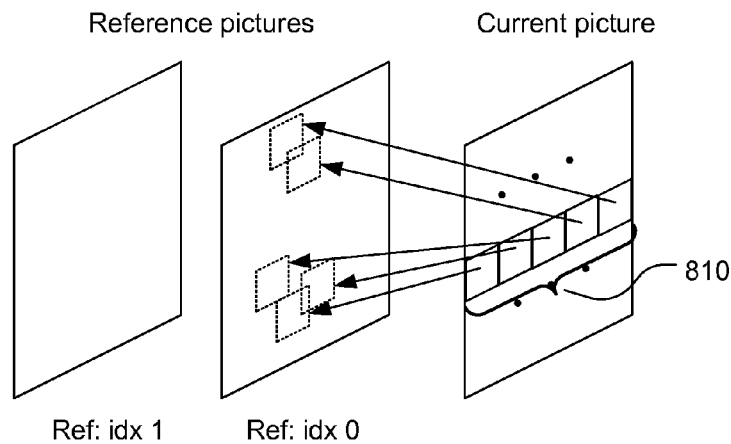
FIG. 8 illustrates an example of reference pictures required for spatial motion vector prediction derivation in Direct and Skip modes according to an embodiment of the present invention.
Figure 9:
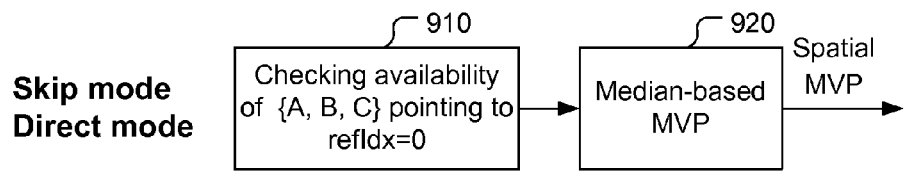
FIG. 9 illustrates an exemplary process for spatial motion vector prediction candidate derivation in Direct mode and Skip mode according to an embodiment of the present invention.

FIG. 8 illustrates an example of the spatial MVP candidate derivation according to an embodiment of the present invention having unified reference picture index. For all the blocks (810) in the current picture, the spatial MVP candidates always point to the same reference picture index (i.e., reference picture index 0 in the example of FIG. 8). Alternatively, the reference picture index for Direct mode is restricted to reference picture index 0. Therefore, the spatial MVP candidates for both Direct mode and Skip mode all point to reference picture index 0. FIG. 9 illustrates an exemplary spatial MVP candidate derivation, where both Direct mode and Skip mode can use the same derivation process and result in the same spatial MVP candidate. For both Direct mode and Skip mode, the derivation process checks, for each neighboring block (A, B or C), whether any MV pointing to reference picture index 0 exists as shown in step 910. After the MVs of the neighboring blocks are determined, the final spatial MVP is determined based on the median of the spatial MVP candidates as shown in step 920. While the median is used as an example to select the final spatial MVP, other criterion may also be used. For example, the final spatial MVP can be determined based on the minimum, maximum, mean, majority or linear combination of the spatial MVP candidates. The final spatial MVP may also be derived based on the first available MVP candidate from the spatial MVP candidates according to a pre-defined search order.

A system incorporating the unified reference picture index for both Direct and Skip modes according to an embodiment of present invention achieves about the same performance as a conventional system. However, the system incorporating the unified reference picture index for both Direct and Skip modes according to an embodiment of present invention provides the advantages of increased cache efficiency and reduced bandwidth requirement. Performance comparisons between a system incorporating an embodiment of the present invention and a conventional system are shown in Table 1. The performance comparisons are based on the differences in bit-rate (dBR) and peak Signal-to-Noise ratio (dPSNR), where a negative dBR value or a positive dPSNR value indicates improvement due to the system incorporating an embodiment of present invention. The comparisons are performed for test data sets S01 through S08. As shown in Table 1, the system incorporating an embodiment of present invention achieves about the same performance as the conventional system.

TABLE 1

|  | Depth Coding | | Total (Synthesed PSNR) | |
| --- | --- | --- | --- | --- |
|  | dBR, % | dPSNR, dB | dBR, % | dPSNR, dB |
| S01 | 0.00 | 0.00 | 0.03 | 0.00 |
| S02 | 0.00 | 0.00 | 0.01 | 0.00 |
| S03 | 0.00 | 0.00 | 0.02 | 0.00 |
| S04 | 0.00 | 0.00 | 0.00 | 0.00 |
| S05 | 0.00 | 0.00 | 0.11 | −0.01 |
| S06 | 0.00 | 0.00 | 0.03 | 0.00 |
| S08 | 0.00 | 0.00 | 0.01 | 0.00 |
| Average | 0.00 | 0.00 | 0.03 | 0.00 |

Figure 10:
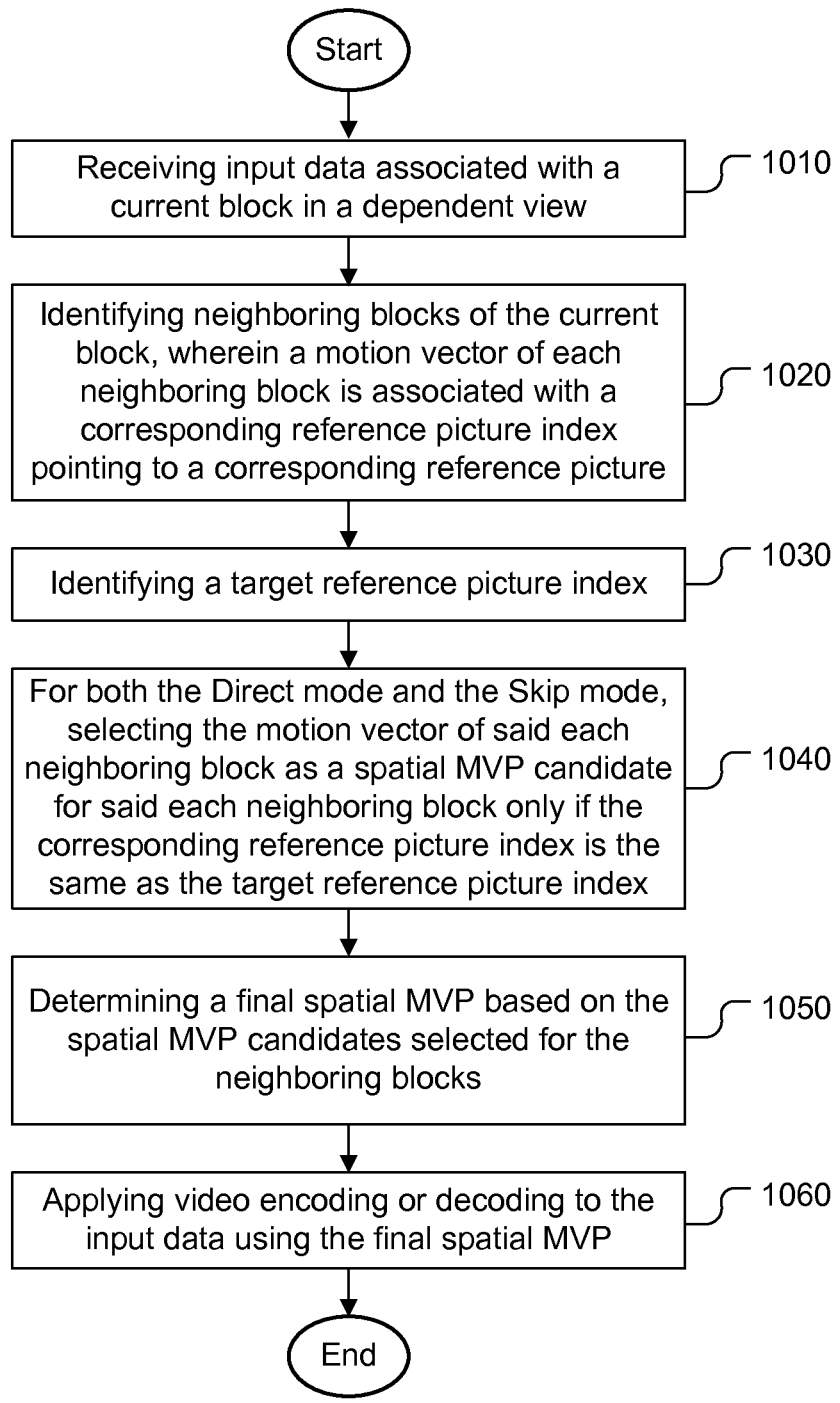
FIG. 10 illustrates an exemplary flowchart of a three-dimensional encoding or decoding system incorporating a unified spatial motion vector prediction candidate derivation according to an embodiment of the present invention.

FIG. 10 illustrates an exemplary flowchart of a three-dimensional encoding or decoding system incorporating a unified reference index for both Direct mode and Skip mode according to an embodiment of the present invention. The system receives input data associated with a current block in a dependent view as shown in step 1010. For encoding, the input data associated with the current block corresponds to original pixel data, depth data, or other information associated with the current block (e.g., motion vector, disparity vector, motion vector difference, or disparity vector difference) to be coded. For decoding, the input data corresponds to the coded data associated with the current block in the dependent view. The input data may be retrieved from storage such as a computer memory, buffer (RAM or DRAM) or other media. The input data may also be received from a processor such as a controller, a central processing unit, a digital signal processor or electronic circuits that produce the input data. Neighboring blocks of the current block are identified as shown in step 1020, wherein a motion vector of each neighboring block is associated with a corresponding reference picture index pointing to a corresponding reference picture. A target reference picture index is identified in step 1030. In step 1040, for both the Direct mode and the Skip mode, the motion vector of said each neighboring block is selected as a spatial MVP candidate for said each neighboring block only if the corresponding reference picture index is the same as the target reference picture index. A default vector is selected as a spatial MVP candidate for said each neighboring block if the corresponding reference picture index of the neighboring block is not the same as the target reference picture index. The default vector can be derived from motion information of a corresponding block in a reference view corresponding to the current block, a disparity vector converted from depth samples of a depth block associated with current block, or a zero motion vector. A final MVP is determined based the spatial MVP candidates selected for the neighboring blocks as shown in step 1050. Video encoding or decoding is then applied to the input data using the final MVP as shown step 1060.

The flowchart shown above is intended to illustrate an example of inter-view prediction using a unified spatial MVP candidate derivation for both Direct and Skip modes. A person skilled in the art may modify each step, re-arranges the steps, split a step, or combine steps to practice the present invention without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be a circuit integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method for spatial motion vector prediction (MVP) candidate derivation for Direct mode and Skip mode in three-dimensional video coding, the method comprising:
   receiving input data associated with a current block in a dependent view;
   identifying neighboring blocks of the current block, wherein a motion vector of each neighboring block is associated with a corresponding reference picture index pointing to a corresponding reference picture;
   identifying a target reference picture index;
   for both the Direct mode and the Skip mode, selecting the motion vector of said each neighboring block as a spatial MVP candidate for said each neighboring block only if the corresponding reference picture index is the same as the target reference picture index;
   determining a final spatial MVP based on the spatial MVP candidates selected for the neighboring blocks; and
   applying video encoding or decoding to the input data using the final spatial MVP.

2. The method of claim 1, further comprises selecting a default vector as the spatial MVP candidate for said each neighboring block if the corresponding reference picture index is not the same as the target reference picture index.

3. The method of claim 2, wherein the default vector is derived from at least a portion of motion information of a corresponding block in a reference view corresponding to the current block, a disparity vector converted from depth samples of a depth block associated with the current block, or a zero motion vector.

4. The method of claim 1, wherein the target reference picture index is 0.

5. The method of claim 1, wherein the target reference picture index corresponds to a majority of the corresponding reference picture indexes associated with the neighboring blocks in the Direct mode, the Skip mode or both.

6. The method of claim 1, wherein a median, minimum, maximum, mean, majority or linear combination of the spatial MVP candidates selected for the neighboring blocks is used as the final spatial MVP.

7. The method of claim 1, wherein the final spatial MVP is derived based on a first available MVP candidate from the spatial MVP candidates according to a pre-defined search order.

8. The method of claim 1, wherein the neighboring blocks comprise a left block, an upper block and an upper-right block of the current block.

9. An apparatus for spatial motion vector prediction (MVP) candidate derivation for Direct mode and Skip mode in three-dimensional video coding, the apparatus comprising one or more electronic circuits, wherein said one or more electronic circuits are configured to:
   receive input data associated with a current block in a dependent view;
   identify neighboring blocks of the current block, wherein a motion vector of each neighboring block is associated with a corresponding reference picture index pointing to a corresponding reference picture;
   identify a target reference picture index;
   for both the Direct mode and the Skip mode, select the motion vector of said each neighboring block as a spatial MVP candidate for said each neighboring block only if the corresponding reference picture index is the same as the target reference picture index;
   determine a final spatial MVP based on the spatial MVP candidates selected for the neighboring blocks; and
   apply video encoding or decoding to the input data using the final spatial MVP.

10. The apparatus of claim 9, wherein said one or more electronic circuits are further configured to select the default vector as a spatial MVP candidate for said each neighboring block if the corresponding reference picture index is not the same as the target reference picture index.

11. The apparatus of claim 9, wherein the default vector is derived from at least a portion of motion information of a corresponding block in a reference view corresponding to the current block, a disparity vector converted from depth samples of a depth block associated with the current block, and a zero motion vector.

12. The apparatus of claim 9, wherein the target reference picture index is 0.

13. The apparatus of claim 9, wherein the target reference picture index corresponds to a majority of the corresponding reference picture indexes associated with the neighboring blocks in the Direct mode or the Skip mode.

14. The apparatus of claim 9, wherein a median, minimum, maximum, mean, majority, or linear combination of the spatial MVP candidates selected for the neighboring blocks is used as the final spatial MVP.

15. The apparatus of claim 9, wherein the final spatial MVP is derived based on a first available MVP candidate from the spatial MVP candidates according to a pre-defined search order.

* * * * *